US009047552B2

(12) United States Patent
Murakawa

(10) Patent No.: US 9,047,552 B2
(45) Date of Patent: Jun. 2, 2015

(54) FORMING SYSTEM AND IMAGE FORMING APPARATUS THAT GENERATE IMAGE LOG DATA TO SERVER

(71) Applicant: KYOCERA Document Solutions Inc., Osaka-shi, Osaka (JP)

(72) Inventor: Tsuyoshi Murakawa, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/285,368

(22) Filed: May 22, 2014

(65) Prior Publication Data

US 2014/0355055 A1 Dec. 4, 2014

(30) Foreign Application Priority Data

Jun. 3, 2013 (JP) .................................. 2013-117410

(51) Int. Cl.
*G06F 3/12* (2006.01)
*G06K 15/02* (2006.01)
(52) U.S. Cl.
CPC ........ *G06K 15/1825* (2013.01); *G06K 15/1809* (2013.01)
(58) Field of Classification Search
USPC .................................................. 358/1.1–3.29
See application file for complete search history.

(56) References Cited

U.S. PATENT DOCUMENTS

| 2002/0131070 A1* | 9/2002 | Housel et al. ................. 358/1.15 |
| 2004/0190060 A1* | 9/2004 | Funakawa et al. ............ 358/1.16 |
| 2006/0039015 A1* | 2/2006 | Kageyama et al. ............ 358/1.5 |
| 2006/0294154 A1* | 12/2006 | Shimizu ........................ 707/200 |
| 2008/0100873 A1* | 5/2008 | Ohtsu ............................ 358/403 |
| 2014/0063548 A1* | 3/2014 | Nagai ........................... 358/1.15 |

FOREIGN PATENT DOCUMENTS

| JP | 2007-279817 | 10/2007 |
| JP | 2008-124902 | 5/2008 |

* cited by examiner

*Primary Examiner* — Marcellus Augustin

(57) ABSTRACT

The image forming apparatus includes a printing device that performs printing on the basis of output image data; a transmission processing unit that generates image log data from the output image data of one page and transmits the generated image log data to a server apparatus that stores image log data corresponding to a print job of plural pages; and a job executing unit that (a) starts a waiting status before a generation process of output image data of a next page when the generation process of the output image data of the aforementioned one page is completed, and (b) releases the waiting status after the image log data corresponding to the output image data of the aforementioned one page is generated and transmitted to the server apparatus by the transmission processing unit.

5 Claims, 3 Drawing Sheets

FORMING SYSTEM AND IMAGE FORMING APPARATUS THAT GENERATE IMAGE LOG DATA TO SERVER

CROSS-REFERENCE TO RELATED APPLICATIONS

This application relates to and claims priority rights from Japanese Patent Application No. 2013-117410, filed on Jun. 3, 2013, the entire disclosures of which are hereby incorporated by reference herein.

BACKGROUND

1. Field of the Present Disclosure

The present disclosure relates to an image forming system and an image forming apparatus.

2. Description of the Related Art

An image forming apparatus generates image log data from output image data used for printing and stores the image log data in a built-in storage unit included in the apparatus. In this situation, in order to make the size of the image log data small, the resolution of the image log data is reduced or some pages are cut.

When the image forming apparatus is capable of performing data communication with a server apparatus through a network, it is possible to transmit the image log data from the image forming apparatus to the server apparatus and store the image log data in the server apparatus.

In case of a print job for printing plural pages, in the image forming apparatus, image processing such as rasterizing and screen processing is continuously performed for original image data of plural pages in turn and consequently output image data of the plural pages is continuously generated in turn. Since an image log job (i.e. generation and transmission of the image log data) can not be executed in parallel with this print job, output image data of the plural pages is stored in the image forming apparatus until the print job is completed, and after the print job is completed, the image log data of the plural pages is transmitted to the server apparatus.

However, for an image forming apparatus as a low-cost model that does not include a built-in non volatile large-scale data storage device such as a hard disk drive or an SSD (Solid State Drive), it is difficult to store the output image data or the image log data of the plural pages in the image forming apparatus itself until the print job is completed as mentioned.

In particular, in case of storing the image log data having the same image resolution as that of the output image data, an image log per page has a large data size, and therefore it is more difficult to store the output image data or the image log data of the plural pages in the image forming apparatus itself until the print job is completed as mentioned.

SUMMARY

An image forming system according to an aspect of the present disclosure includes an image forming apparatus, and a server apparatus configured to store image log data corresponding to a print job of plural pages executed in the image forming apparatus. The image forming apparatus includes a printing device configured to perform printing on the basis of output image data; a transmission processing unit configured to generate the image log data from the output image data of one page and transmit the generated image log data to the server apparatus; and a job executing unit configured (a) to start a waiting status before a generation process of output image data of a next page when the generation process of the output image data of said one page is completed, and (b) to release the waiting status after the image log data corresponding to the output image data of said one page is generated and transmitted to the server apparatus by the transmission processing unit.

An image forming apparatus according to an aspect of the present disclosure includes a printing device configured to perform printing on the basis of output image data; a transmission processing unit configured to generate the image log data from the output image data of one page and transmit the generated image log data to a server apparatus that stores image log data corresponding to a print job of plural pages; and a job executing unit configured (a) to start a waiting status before a generation process of output image data of a next page when the generation process of the output image data of said one page is completed, and (b) to release the waiting status after the image log data corresponding to the output image data of said one page is generated and transmitted to the server apparatus by the transmission processing unit.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
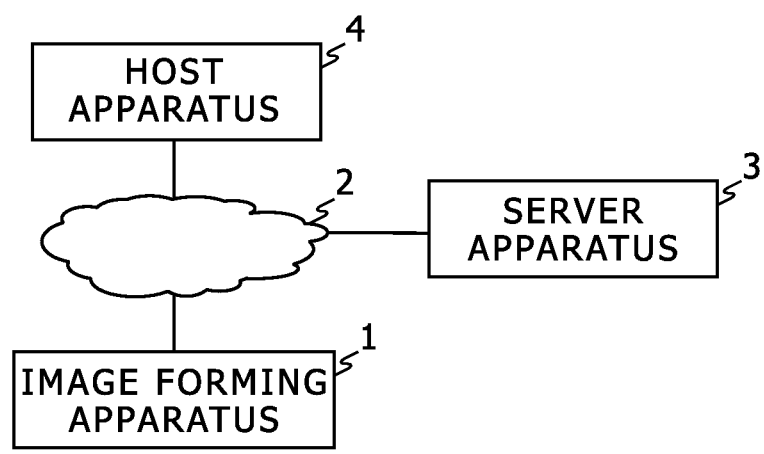
FIG. 1 shows a block diagram that indicates a configuration of an image forming system in an embodiment of the present disclosure.

FIG. 1 shows a block diagram that indicates a configuration of an image forming system in an embodiment of the present disclosure. In this system, an image forming apparatus 1 is connected to a network 2, and a server apparatus 3 and a host apparatus 4 are also connected to the network 2.

In this embodiment, the image forming apparatus 1 is a multi function peripheral. The image forming apparatus 1 may be another type of an apparatus having a printing function such as a printer, a facsimile machine, or a copier. The network 2 is a LAN (Local Area Network) and/or a WAN (Wide Area Network), and the server apparatus 3 receives image log data corresponding to a print job of plural pages from the image forming apparatus 1 and stores the received image log data. The host apparatus 4 is an apparatus that transmit print data to the image forming apparatus and causes the image forming apparatus 1 to execute a print job based on the print data.

Figure 2:
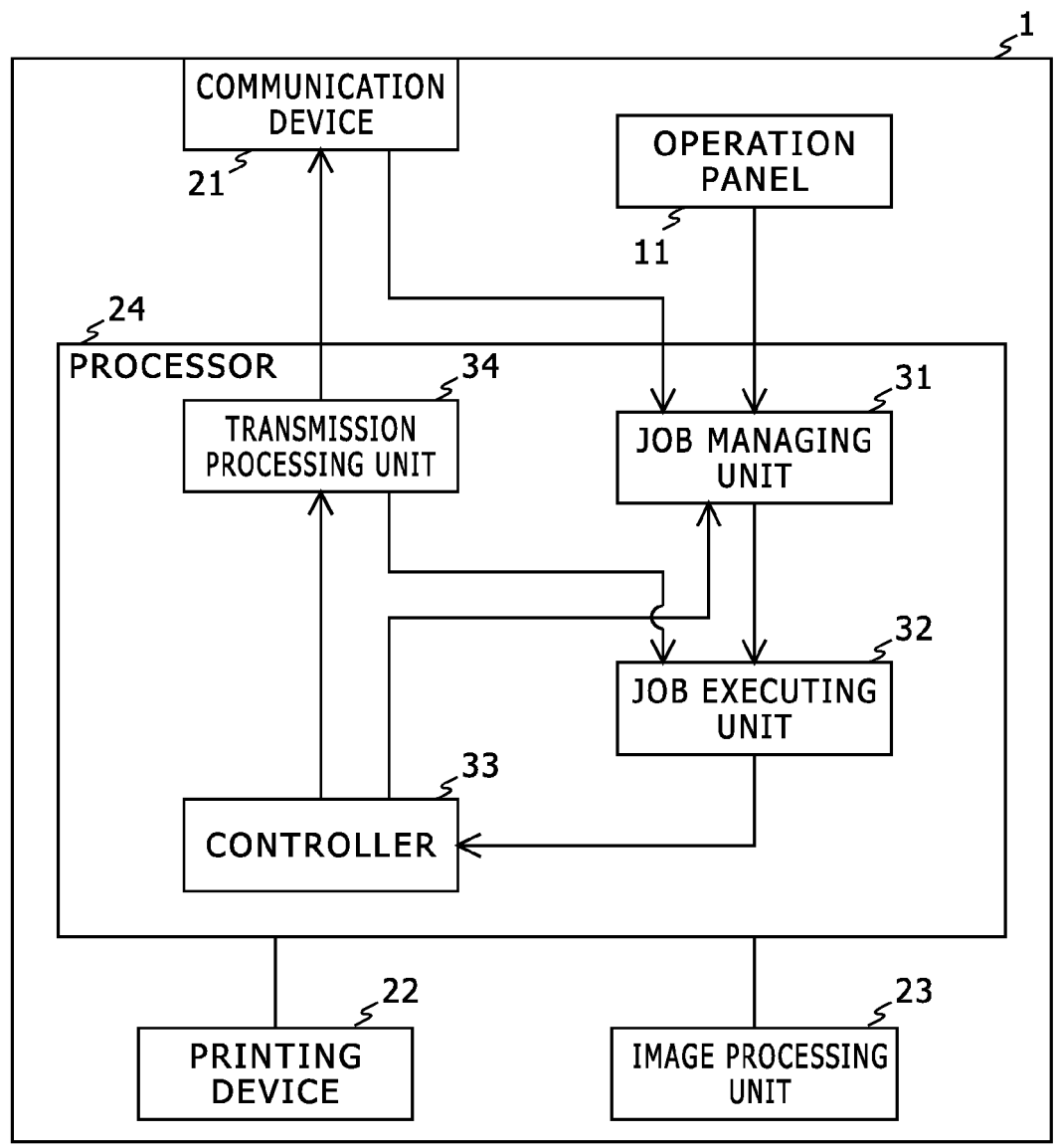
FIG. 2 shows a block diagram that indicates a configuration of an image forming apparatus 1 in FIG. 1.

FIG. 2 shows a block diagram that indicates a configuration of the image forming apparatus 1 in FIG. 1.

As shown in FIG. 2, this image forming apparatus 1 includes an operation panel 11, a communication device 21, a printing device 22, an image scanning device 23, and a processor 24.

The operation panel 11 includes a display device such as a liquid crystal display and an input device such as a touch panel, and displays an operation screen for a user and detects a user operation.

Further, the communication device 21 is capable of connecting to another device (e.g. the server apparatus 3 or the host apparatus 4) in this system through the network 2, and performs data communication according to a predetermined communication protocol.

Furthermore, the printing device 22 is an internal device that prints a document image on a printing paper sheet, for example, in an electrophotographic manner. The printing device 22 performs printing on the basis of output image data generated by performing predetermined image processing such as rasterizing, color conversion, or a screen process for an original image data.

Furthermore, the image scanning device 23 is an internal device that optically scans a document image from a document, and generates image data of the document image.

Furthermore, the processor 24 is a computer which includes a CPU (Central Processing Unit), a ROM (Read Only Memory), and a RAM (Random Access Memory), loads a program from the ROM and the like to the RAM, and executes the program with the CPU to act as various processing units. The processor 24 acts as a job managing unit 31, a job executing unit 32, a controller 33, and a transmission processing unit 34.

The job managing unit 31 receives a print request and a copy request based on a user operation to the operation panel 11, a print request received from the host apparatus 4, and the like, and causes the job executing unit 32 to execute a print job corresponding the received request and controls the progress of the print job.

In this embodiment, for a specific type among predetermined job types of jobs such as a print job of copying and a print job of facsimile reception, the job managing unit 31 causes to perform image log saving (i.e. the generation and the transmission of image log data by the transmission processing unit 34 and the waiting status before the generation process of the output image data of the next page by the job executing unit 32); and for the other types of jobs, the job managing unit 31 does not cause to perform the image log saving.

Further, for a specific page (e.g. a top page or a page specified by an administrator or a service person) in plural pages of a print job, the job managing unit 31 causes to perform the image log saving; and for the other pages, the job managing unit 31 does not cause to perform the image log saving.

If the image log is saved in the server apparatus 3, the job executing unit 32 (a) starts a waiting status before a generation process of output image data of the next page to a current page (one page) when the generation process of the output image data of the current page is completed, and (b) releases this waiting status after the image log data corresponding to the output image data of the current page is generated and transmitted to the server apparatus 3 by the transmission processing unit. For each page after the aforementioned next page, the job executing unit 32 performs the aforementioned processes (a) and (b) page by page until the last page.

Contrarily, if the image log is not saved in the server apparatus 3, for a print job of plural pages, the job executing unit 32 immediately starts the generation process of the output image data of the next page when the generation process of the output image data of the current page is completed.

When the generation process of the output image data of a page, the output image data is transferred to the printing device 22, and the printing device 22 performs printing the page on the basis of the output image data.

Further, in this embodiment, the job executing unit 32 allocates a first work area used for generating the output image data and the image log data of the current page in a volatile memory (i.e. the aforementioned RAM), and discards the first work area and allocates a second work area used for generating the output image data and the image log data of the next page in the volatile memory when releasing the waiting status before the generation process of the output image data of the next page. Thus, a work area of one page allocated in the volatile memory is sufficient to transmit image logs of the plural pages. Therefore, this image forming apparatus 1 does not include a built-in large-scale data storage device.

The controller 33 receives a notification from the job managing unit 31, the job executing unit 32, the transmission processing unit 34, and the like, and transmits a notification to these units in order to watch the progress of sorts of processes.

The transmission processing unit 34 generates image log data in a predetermined image data format (e.g. JPEG: Joint Photographic Experts Group) as an image log file from the output image data of one page, and transmits the generated image log data (i.e. the image log file) to the server apparatus 3 using the communication device 21. In this embodiment, the image resolution of the image log data is set to be equal to the image resolution of the output image data.

The following part explains storing an image log in the aforementioned system.

Figure 3:
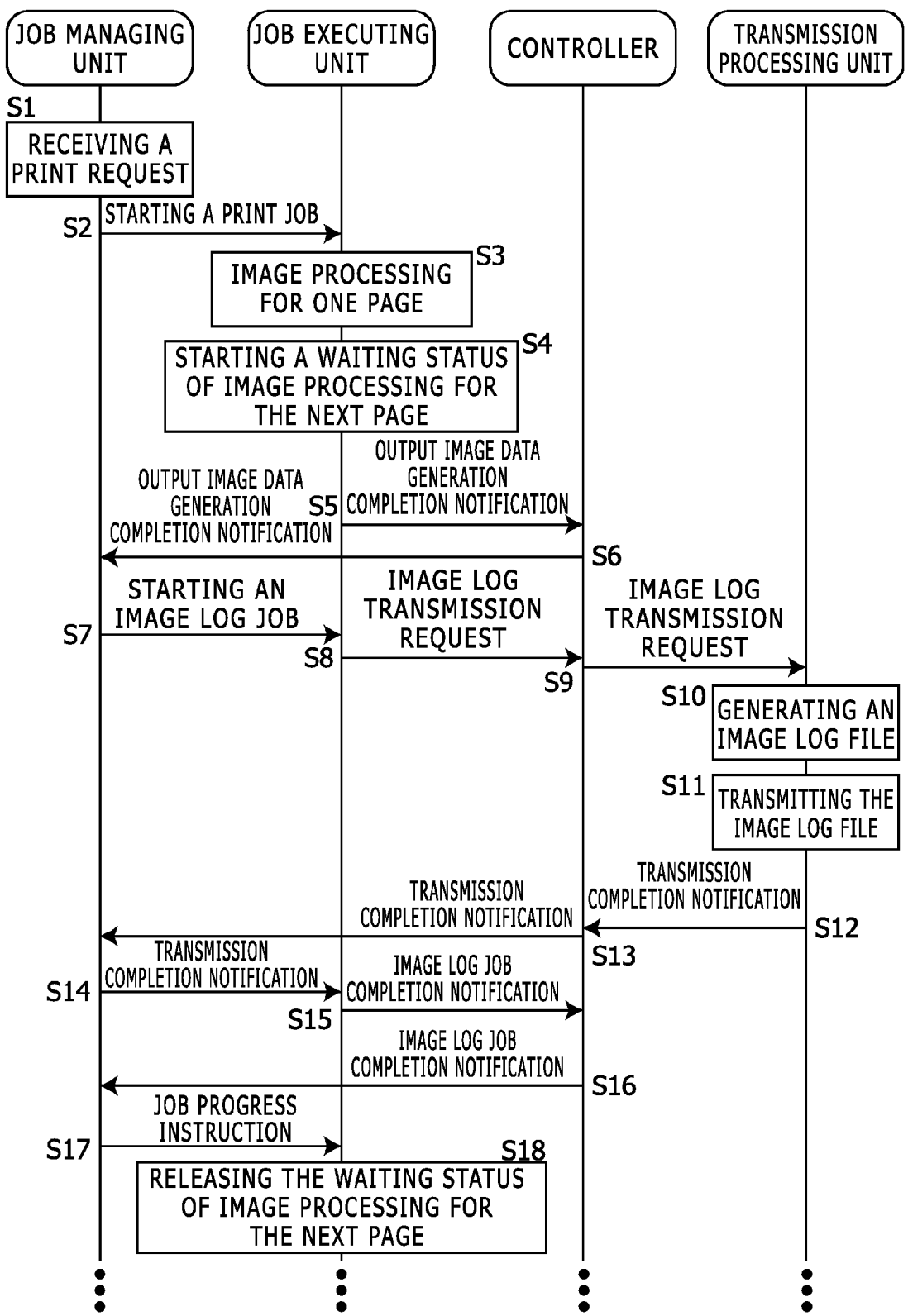
FIG. 3 shows a sequence diagram that explains a behavior of the image forming apparatus 1 shown in FIG. 2.

FIG. 3 shows a sequence diagram that explains a behavior of the image forming apparatus 1 shown in FIG. 2.

Upon receiving a print request (in Step S1), the job managing unit 31 requests of the job executing unit 32 to execute a print job corresponding to the print request (in Step S2).

Upon receiving the request, the job executing unit 32 firstly performs image processing to generate output image data for the first page in plural pages to be printed in the print job (in Step S3). The generated output image data of the page is stored in a work area allocated for this page in the RAM.

After completing the image processing to generate the output image data of the current page, the job executing unit 32 does not immediately start image processing to generate output image data of the next page and starts a waiting status before this image processing of the next page (in Step S4). Upon completing the image processing to generate the output image data of the current page, a generation completion notification of the output image data is immediately transmitted from the job executing unit 32 through the controller 33 to the job managing unit 31 (in Steps S5 and S6).

Upon receiving the generation completion notification of the output image data, the job managing unit 31 requests of the job executing unit 32 to execute an image log job of the current page (in Step S7). Upon receiving the request, the job executing unit 32 transmits an image log transmission request through the controller 33 to the transmission processing unit 34 (in Steps S8 and S9).

Upon receiving the image log transmission request, the transmission processing unit 34 reads the output image data from the work area, generates an image log file that includes the image log data (in Step S10), and transmits the generated image log file to the server apparatus 3 using the communication device 21 (in Step S11). At this timing, property information of the image log file (such as page number, a job name, and the like) is transmitted together with the image log file. The server apparatus 3 receives the image log file and the property information and stores the received image log file so as to be related to the received property information.

Upon completing the transmission of the image log file of the one-page print image, a transmission completion notification is transmitted from the transmission processing unit 34 through the controller 33 and the job managing unit 31 to the job executing unit 32 (in Steps S12, S13, and S14).

Upon receiving the transmission completion notification, the job executing unit 32 determines that the image log job has been completed, and transmits an image log job completion notification through the controller 33 to the job managing unit 31 (in Steps S15 and S16).

Upon receiving the image log job completion notification, the job managing unit 31 determines that the image log of the one-page print image has been saved in the server apparatus 3, and outputs a job progression instruction to the job executing unit 32 for starting the process of the next page (in Step S17).

Upon receiving the job progress instruction, the job executing unit 32 releases the waiting status (that has been started in Step S4) of the image processing for the next page (in Step S18). At this timing, the job executing unit 32 discards the work area for the page of which the image log has been saved in the server apparatus 3, and allocates a work area for the next page.

Subsequently, the processes in Steps S3 to S18 are performed page by page for each page after the next page. Since no pages do not exist next to the last page, Step S4 and S15 to S18 are not performed for the last page, and at the timing when completion is informed of the image log saving to the server apparatus 3 for the last page, the job executing unit 32 determines that the print job has been completed.

In the aforementioned embodiment, the image forming apparatus 1 includes the printing device 22 that performs printing on the basis of output image data; the transmission processing unit 34 that generates the image log data from the output image data of one page and transmits the generated image log data to the server apparatus 3 that stores image log data corresponding to a print job of plural pages; and the job executing unit 32 that (a) starts a waiting status before a generation process of output image data of a next page when the generation process of the output image data of the aforementioned one page is completed, and (b) releases the waiting status before the generation process of the output image data of the next page after the image log data corresponding to the output image data of the aforementioned one page is generated and transmitted to the server apparatus 3 by the transmission processing unit 32.

Thus, in a print job of plural pages, image log data of a print image of each page is transmitted to the server apparatus 3 every time when the image processing for the page is completed, and after the transmission, the image processing for the next page is started. Therefore, even though the image forming apparatus 1 does not include a built-in non volatile large-scale data storage device such as a hard disk drive or an SSD, the image log is successfully saved in the server apparatus 3.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming system, comprising:
   an image forming apparatus; and
   a server apparatus configured to store image log data corresponding to a print job of plural pages executed in the image forming apparatus;
   wherein the image forming apparatus comprises:
   a printing device configured to perform printing on the basis of output image data;
   a transmission processing unit configured to generate the image log data from the output image data of one page and transmit the generated image log data to the server apparatus; and
   a job executing unit configured (a) to start a waiting status before a generation process of output image data of a next page when the generation process of the output image data of said one page is completed, and (b) to release the waiting status after the image log data corresponding to the output image data of said one page is generated and transmitted to the server apparatus by the transmission processing unit; wherein the job executing unit is further configured to allocate a first work area used for generating the output image data and the image log data of said one page in a volatile memory, and to discard the first work area and allocate a second work area used for generating the output image data and the image log data of the next page in the volatile memory when releasing the waiting status before the generation process of the output image data of the next page.

2. An image forming apparatus, comprising:
   a printing device configured to perform printing on the basis of output image data;
   a transmission processing unit configured to generate image log data from the output image data of one page and transmit the generated image log data to a server apparatus that stores image log data corresponding to a print job of plural pages; and
   a job executing unit configured (a) to start a waiting status before a generation process of output image data of a next page when the generation process of the output image data of said one page is completed, and (b) to release the waiting status after the image log data corresponding to the output image data of said one page is generated and transmitted to the server apparatus by the transmission processing unit; wherein the job executing unit is further configured to allocate a first work area used for generating the output image data and the image log data of said one page in a volatile memory, and to discard the first work area and allocate a second work area used for generating the output image data and the image log data of the next page in the volatile memory when releasing the waiting status before the generation process of the output image data of the next page.

3. The image forming apparatus according to claim 2, further comprising a job managing unit configured to cause the job executing unit to perform generation of the image log data by the transmission processing unit and the waiting status by the job executing unit for a specific job, and not to cause the job executing unit to perform generation of the image log data by the transmission processing unit and the waiting status by the job executing unit for a job other than the specific job.

4. The image forming apparatus according to claim 2, further comprising a job managing unit configured to cause the job executing unit to perform generation of the image log data by the transmission processing unit and the waiting status by the job executing unit for a specific page in the plural pages, and not to cause the job executing unit to perform generation of the image log data by the transmission processing unit and the waiting status by the job executing unit for a page other than the specific page.

5. The image forming apparatus according to claim 2, wherein an image resolution of the image log data is the same as an image resolution of the output image data.

* * * * *